L. E. BOWSER.
COTTON CHOPPER.
APPLICATION FILED MAY 16, 1911.
1,027,687.
Patented May 28, 1912.
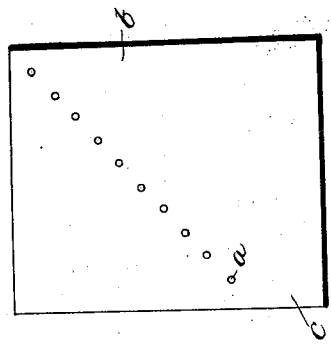
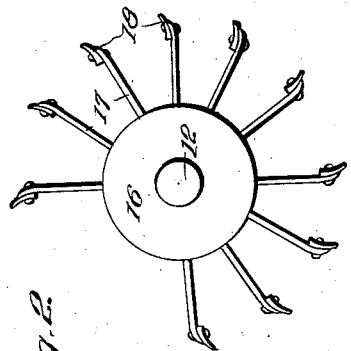
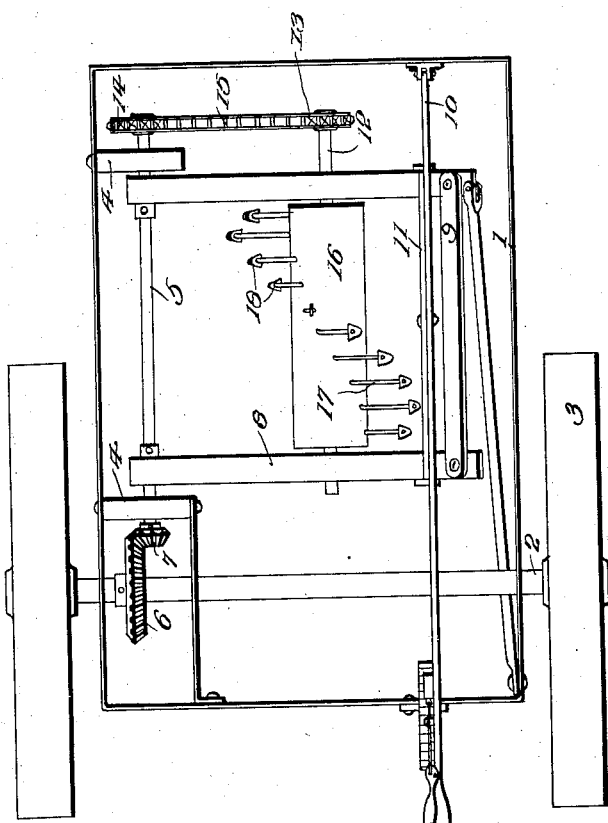
Witnesses
Inventor
L. E. Bowser
By
Attorneys.

UNITED STATES PATENT OFFICE.

LESLIE E. BOWSER, OF LOS ANGELES, CALIFORNIA.

COTTON-CHOPPER.

1,027,687.  Specification of Letters Patent.  Patented May 28, 1912.

Application filed May 16, 1911. Serial No. 627,580.

*To all whom it may concern:*

Be it known that I, LESLIE E. BOWSER, citizen of the United States, residing at Los Angeles, in the county of Los Angeles and State of California, have invented certain new and useful Improvements in Cotton-Choppers, of which the following is a specification.

This invention relates to cotton choppers, and has for its object to provide a rotor of especial design and arrangement which carries cutters spirally arranged and so positioned upon the rotor that they operate successively in the soil during the cutting operation in comparatively narrow cuts, whereby the tendency to side draft is eliminated or materially reduced. The arrangement of the cutters is such that during the cutting operation space is left between the paths of movement of the terminal cutters of the series and it is in this space that the plants are left standing in the row.

For a full understanding of the invention reference is to be had to the following description and accompanying drawing, in which:

Figure 1 is a top plan view of the cotton chopper; Fig. 2 is an end view of the rotor thereof; Fig. 3 is a flattened or conventionalized plan of the periphery of the rotor, indicating the relative positions of the cutters thereon.

Corresponding and like parts are referred to in the following description and indicated in all the views of the accompanying drawings by the same reference characters.

The cotton chopper includes a frame 1 which is mounted upon an axle 2 which in turn is supported by ground wheels 3. Bearings 4 are carried by the frame 1 and a shaft 5 is journaled in the said bearings. The shaft 5 extends parallel with the line of draft of the machine. A gear wheel 6 is fixed to the axle 2 and a gear wheel 7 is fixed to the rear end of the shaft 5 and meshes with the said gear wheel 6. Arms 8 are pivotally mounted upon the shaft 5 and are located between the sides of the frame 1 and extend transversely of the line of draft of the machine. The free end portions of arms 8 are connected together by a bar 9. A lever 10 is fulcrumed upon the frame 1 and a link 11 pivotally connects the lever 10 with the arms 8. By this arrangement means is provided for raising and lowering the free end portions of the arms 8 by using the lever 10, so that the cutters hereinafter described and which are carried by the arms may be caused to operate at any desired depth in the soil or may be lifted entirely above the surface thereof.

The rotor consists of a shaft 12 which is journaled in the arms 8 and which is provided at its forward end with a sprocket wheel 13. The shaft 12 is approximately midway between the sides of the frame 1. A sprocket wheel 14 is mounted upon the forward end of the shaft 5 and a sprocket chain 15 is trained around the wheels 13 and 14 and is adapted to transmit movement from the shaft 5 to the shaft 12. A cylinder 16 is mounted upon the shaft 12 between the arms 8 and a series of shanks 17 are mounted upon the periphery of the cylinder 16 and are arranged in a spiral row which extends from one end to the other of the cylinder. The long dimensions of the stems 17 are radially disposed with relation to the axes of the cylinder and shaft 12. The stems 17 carry at their outer ends relatively narrow cutters or points 18. These cutters are spaced from each other in a direction lengthwise of the cylinder for a distance just sufficient to cause them to operate on or cut in the surface of the soil for a length equal to the length of the cylinder plus the distance that the cylinder travels while it is making a single revolution minus a space corresponding with the space between the terminal cutters 18 which interrupts the complete spiral arrangement of the cutters. Therefore as the cutters come in contact with the soil they will cut out the superfluous plants as they move transversely of the row, but when the space between the ends of the spiral arrangement at the terminal cutters is turned down over the plants one or more of the plants will be left standing in the row.

The conventionalized arrangement of the shanks of the cutters is most clearly illustrated in Fig. 3, in which the line of dots *a* indicate the positions of the said shanks as they would appear if the periphery of the cylinder was flattened out. This line extends obliquely across the field *b*, representing the periphery of the cylinder, but space *c* is that at which the interruption of the spiral occurs when the shanks are arranged upon the cylinder rotor.

Having thus described the invention, what is claimed as new is:

1. In a cotton chopper, a rotor having upon its periphery a single series of shanks arranged in a spiral row at equal distances apart, the space between the terminal shanks in a direction longitudinally of the rotor being greater than the space between the adjacent shanks in the same direction, and cutters carried by the shanks.

2. In a cotton chopper, a rotor comprising a shaft, a cylinder located thereon, a single series of shanks fixed to the cylinder and arranged in a spiral row at equal distances apart, the spaces between the terminal shanks in a direction longitudinally of the rotor being greater than the space between the adjacent shanks in the same direction, and cutters carried by the shanks.

In testimony whereof, I affix my signature in presence of two witnesses.

LESLIE E. BOWSER. [L. S.]

Witnesses:
ALLEN M. STRATTON,
JOHN F. HINRICHS.

Copies of this patent may be obtained for five cents each, by addressing the "Commissioner of Patents, Washington, D. C."